United States Patent
Yu (10) Patent No.: US 11,827,107 B2
(45) Date of Patent: Nov. 28, 2023

(54) ROUGH ROAD ESCAPING SYSTEM FOR VEHICLE HAVING ELECTRIC-AXLE AND METHOD THEREOF

(71) Applicants: Hyundai Motor Company, Seoul (KR); Kia Corporation, Seoul (KR)

(72) Inventor: Seung Wan Yu, Yeosu-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 189 days.

(21) Appl. No.: 17/484,716

(22) Filed: Sep. 24, 2021

(65) Prior Publication Data
US 2022/0297547 A1     Sep. 22, 2022

(30) Foreign Application Priority Data
Mar. 16, 2021 (KR) .................. 10-2021-0033741

(51) Int. Cl.
B60L 15/20     (2006.01)

(52) U.S. Cl.
CPC ......... B60L 15/20 (2013.01); *B60L 2240/421* (2013.01); *B60L 2240/423* (2013.01); *B60L 2240/647* (2013.01); *B60L 2250/26* (2013.01)

(58) Field of Classification Search
CPC ...... B60L 15/20; B60L 15/2081; B60L 15/32; B60L 2240/421; B60L 2240/423; B60L 2240/647; B60L 2240/645; B60L 2250/26; B60L 2250/12; B60L 2250/28; B60L 2200/36; B60L 2200/18; B60L 2220/42; B60L 2270/145; B60L 50/60; B60K 1/02; B60K 7/0007; B60K 17/22; B60Y 2200/14; B60Y 2200/91
See application file for complete search history.

(56) References Cited

U.S. PATENT DOCUMENTS

| | | | |
|---|---|---|---|
| 7,742,852 B1 * | 6/2010 | Tang ................. | B60T 8/175 |
| | | | 701/22 |
| 9,707,965 B2 | 7/2017 | Mair | |
| 9,738,283 B2 | 8/2017 | Mair | |

FOREIGN PATENT DOCUMENTS

| | | | | |
|---|---|---|---|---|
| DE | 102010043250 A1 * | 5/2012 | ............ | B60W 10/02 |
| EP | 1625041 B1 * | 3/2008 | ............ | B60K 28/16 |
| EP | 2768709 B1 * | 3/2017 | ............ | B60W 20/00 |
| JP | 3370983 B2 | 1/2003 | | |
| JP | 6361079 B2 | 7/2018 | | |

* cited by examiner

*Primary Examiner* — Michael J Zanelli
(74) *Attorney, Agent, or Firm* — MORGAN, LEWIS & BOCKIUS LLP (57) ABSTRACT

A rough road escaping system for a vehicle having an electric-axle and a method thereof, may enable wheels respectively connected to first and second axle shafts to easily escape from a rough road by generating a recoiling force of the vehicle through motor torque control that alternately applies several time forward driving torque output from a first motor included in a rear wheel-first electric-axle to a first axle shaft and backward driving torque output from a second motor included in a rear wheel-second electronic-axle to a second axle shaft.

16 Claims, 4 Drawing Sheets

ROUGH ROAD ESCAPING SYSTEM FOR VEHICLE HAVING ELECTRIC-AXLE AND METHOD THEREOF

CROSS-REFERENCE TO RELATED APPLICATION

The present application claims priority to Korean Patent Application No. 10-2021-0033741, filed on Mar. 16, 2021, the entire contents of which is incorporated herein for all purposes by this reference.

BACKGROUND OF THE INVENTION

Field of the Invention

The present invention relates to a rough road escaping system for a vehicle having an electric-axle and a method thereof, and more particularly to a system and method for a vehicle having an electric-axle to easily escape from a rough road through motor torque control that alternately applies forward driving torque and rearward driving torque.

Description of Related Art

As eco-friendly vehicles such as an electric vehicle and fuel cell electric vehicle come into the market, a battery electric truck or a fuel cell electric vehicle provided with electric-axle assembly are being developed as a kind of eco-friendly commercial vehicles.

Common vehicles having an electric-axle may be developed to a level satisfying both of the driving performance and the functions of vehicles provided with a diesel engine.

For example, a rocking-free function for escaping from a rough road is one of peculiar functions of existing diesel engine trucks and needs to be applied to vehicles having an electric-axle.

The rocking-free function is to escape from a rough road using a recoiling force by repeating forward and backward diving when wheels of a diesel engine truck sink into a rough road (a muddy road, a puddle, an icy road, etc.) and cannot escape from the rough road.

The rocking-free function applied to existing diesel engine trucks is described hereafter.

First, when a wheel connected to a rear wheel-first shaft and a wheel connected to a rear wheel-second shaft sink into a rough road and cannot escape while idling, a driver presses a rocking-free switch in the cabin.

Accordingly, when the rocking-free switch is pressed, the automatic transmission mounted on the output shaft of a diesel engine selects a gear (e.g., the current+1 gear) suitable for escaping from the rough road.

Next, the driver repeats pressing down and releasing the accelerator pedal.

When the driver presses down the acceleration pedal, the clutch for the selected gear in the automatic transmission is engaged, so engine power is transmitted to the rear wheel-first shaft and the rear wheel-second shaft and the wheels are rotated forward thereof.

On the other hand, when the driver releases the acceleration pedal, the clutch for the selected gear in the automatic transmission is disengaged, and the engine power stops being transmitted to the rear wheel-first shaft and the rear wheel-second shaft and the wheels are naturally rotated backward thereof.

Accordingly, when the driver repeats pressing down and releasing of the acceleration pedal, a first operation in which the wheels are rotated forward to move to the front end portion from the bottom portion of a rough road by the engine power transmitted with the clutch engaged and a second operation in which the wheels are rotated backward to move to the bottom portion of the rough road due to stop of transmission of the engine power with the clutch disengaged are repeated. The first operation and the second operation are repeated several times, generating a recoiling force of the vehicle.

As a result, after a recoiling force of the vehicle is generated by several-time repetition of the first operation and the second operation, the wheels can easily come out of the rough road by the recoiling force when the first operation is made of at any moment.

The rocking-free function applied to existing diesel engine trucks may be achieved using the power output through a diesel engine and an automatic transmission, but a rocking-free function which may be achieved in another way is required for vehicles having an electric-axle because the vehicles use power from a motor.

In other words, considering that vehicles having an electric-axle may be developed to a level satisfying both of the driving performance and the functions of vehicles provided with a diesel engine, the rocking-free function according to another method for escaping from a rough road may also be applied to common vehicles.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a rough road escaping system for a vehicle having an electric-axle and a method thereof, the system and method facilitating wheels respectively connected to first and second axle shafts to easily escape from a rough road by generating a recoiling force of the vehicle through motor torque control that alternately applies several time forward driving torque output from a first motor included in a rear wheel-first electric-axle to a first axle shaft and rearward driving torque output from a second motor included in a rear wheel-second electronic-axle to a second axle shaft.

A rough road escaping system for a vehicle having an electric-axle according to various exemplary embodiments of the present invention includes: a rocking-free switch; an acceleration pedal switch configured for outputting an on-signal when an accelerator pedal is pressed downwards; a first motor provided in a rear wheel-first electric-axle; a second motor provided in a rear wheel-second electric-axle; and a controller configured for repeating first torque control making the first motor output forward driving torque and second torque control making the second motor output rearward driving torque in a response to a periodic on-signal of the accelerator pedal switch.

The controller may include: a vehicle controller electrically connected to the motor controller and configured for applying a motor torque instruction for a rocking-free function to a motor controller when receiving an on-signal of the acceleration pedal switch after receiving an on-signal of the rocking-free switch; and the motor controller repeating the first torque control making the first motor output the forward driving torque to a first axle shaft of the rear wheel-first electric axle and the second torque control making the second motor output the rearward driving torque to a second axle shaft of the rear wheel-second electric-axle.

The controller may be configured to repeat the first torque control making the first motor output the forward driving torque and the second torque control making the second motor output the rearward driving torque, until the vehicle escapes from a predetermined area of a road.

The controller may be configured to decrease torque of the first motor in advance to zero when performing the second torque control making the second motor output the rearward driving torque after performing the first torque control making the first motor output the forward driving torque.

The controller may be configured to decrease torque of the second motor in advance to zero when performing again the first torque control making the first motor output the forward driving torque after performing the second torque control making the second motor output the rearward driving torque.

A rough road escaping method for a vehicle having an electric-axle according to various exemplary embodiments of the present invention includes: turning on a rocking-free switch; periodically pressing down an accelerator pedal with the rocking-free switch turned on; and repeating first torque control making a first motor provided in a rear wheel-first electric axle output forward driving torque and second torque control making a second motor provided in a rear wheel-second electric-axle output rearward driving torque, when the accelerator pedal is periodically pressed downwards.

When the accelerator pedal is initially pressed down with the rocking-free switch turned on and the first motor provided in the rear wheel-first electric-axle outputs forward driving torque, the second motor included in the rear wheel-second electric-axle may be maintained in a standby state without torque thereof controlled.

The first torque control making the first motor output forward driving torque and the second torque control making the second motor output rearward driving torque may be repeated until the vehicle escapes from a predetermined area of a road.

Torque of the first motor may be decreased in advance to zero when the second torque control making the second motor output rearward driving torque is performed after the first torque control making the first motor output forward driving torque is performed.

Torque of the second motor may be decreased in advance to zero when the first torque control making the first motor output forward driving torque is performed again after the second torque control making the second motor output the rearward driving torque.

A recoiling force of the vehicle for escaping a rough road may be generated by repeating: a first operation in which forward driving torque of the first motor of the rear wheel-first electric-axle is output to a first axle shaft and a first wheel so that the first wheel rotates forward to move to a front end portion from a bottom portion of the rough road; and a second operation in which rearward driving torque of the second motor of the rear wheel-second electric-axle is output to a second axle shaft and a second wheel so that the second wheel rotates rearward to move to a rear end portion from the bottom portion of the road.

Various aspects of the present invention provide the following effects through the objectives described above.

First, it is possible to easily achieve the rocking-free function for escaping from a rough road even in a vehicle such as an electric truck or fuel cell electric truck provided with an electric-axle.

That is, it is possible to achieve the rocking-free function facilitating wheels respectively connected to first and second axle shafts to easily escape from a rough road by generating a recoiling force of the vehicle through motor torque control that alternately applies several time forward driving torque output from a first motor included in a rear wheel-first electric-axle to a first axle shaft and backward driving torque output from a second motor included in a rear wheel-second electronic-axle to a second axle shaft.

Second, since it is possible to achieve the rocking-free function of existing diesel engine trucks in the same way in vehicles having an electric-axle, it is possible to improve the performance of a vehicle having an electric-axle over the performance of a vehicle provided with a diesel engine in the related art.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the accompanying drawings.

Figure 1:
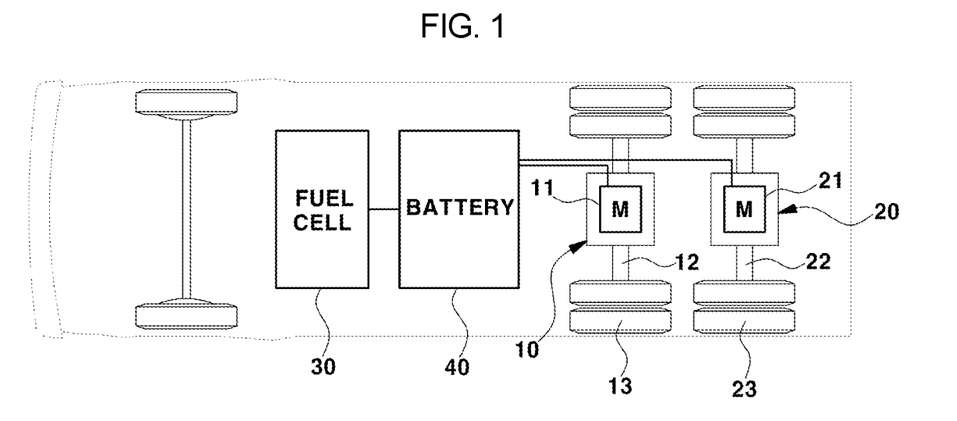
FIG. 1 is a schematic diagram showing a power train of a fuel cell electric truck of vehicles having an electric-axle.

FIG. 1 is a schematic diagram showing a power train of a fuel cell electric truck of vehicles having an electric-axle.

As shown in FIG. 1, a fuel cell electric truck of vehicles having an electric-axle includes a fuel cell 30 generating electrical energy 30 and a battery 40 being charged with the electrical energy generated by the fuel cell 30.

The a fuel cell electric truck has a pair of rear wheels that are driving wheels at the rear in addition to front wheels at the front, in which a first electric-axle 10 is mounted at the front rear wheels of the pair of rear wheels and a second electric-axle 20 is mounted at the rear rear wheels.

The rear wheel-first electric axle 10 may include an axle housing, a first motor 11 mounted in the axle housing and being driven by the electrical energy of the fuel cell 30 or the battery 40, a first axle shaft 12 connected to an output shaft of the first motor 11, first wheels 13 mounted at both end portions of the first axle shaft 12.

The rear wheel-second electric axle 20 may also include an axle housing, a second motor 21 mounted in the axle housing and being driven by the electrical energy of the fuel cell 30 or the battery 40, a second axle shaft 22 connected to an output shaft of the second motor 21, second wheels 23 mounted at both end portions of the second axle shaft 22.

A reducer may be connected to the output shafts of the first motor 11 and the second motor 21.

The present invention was designed to enable a rocking-free function for escaping from a rough road applied to existing diesel engine trucks even in vehicles such as a fuel cell electric truck having an electric-axle.

Figure 2:
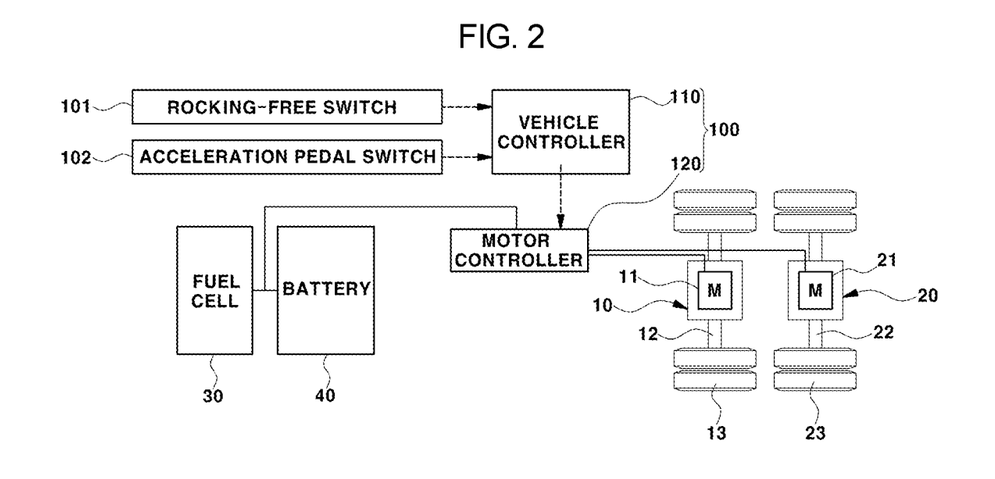
FIG. 2 is a diagram showing the configuration of a rough road escaping system for a vehicle having an electric-axle according to various exemplary embodiments of the present invention.

FIG. 2 is a diagram showing the configuration of a rough road escaping system for a vehicle having an electric-axle according to various exemplary embodiments of the present invention.

As shown in FIG. 2, a rough road escaping system for a vehicle having an electric-axle for achieving the rocking-free function includes a rocking-free switch 101, an acceleration pedal switch 102, and a controller 100 controlling torque of a first motor 11 of a rear wheel-first electric-axle 10 or torque of a second motor 21 of a rear wheel-second electric-axle 20 on the basis of signals from the rocking-free switch 101 and the acceleration pedal switch 102.

The rocking-free switch 101, which is disposed around a driver seat in a cabin, is turned on by a driver and outputs an on-signal to the controller 100 to enable a vehicle to escape when a first rear wheel and a second rear wheel sink into a rough road (a muddy road, a pool, an icy road, etc.) and cannot escape from the rough road.

The acceleration pedal switch 102 is pressed and outputs an on-signal to the controller 100 when a driver presses down an acceleration pedal, and outputs an off-signal to the controller 100 when the accelerator pedal is released.

The controller 100 may be one integrated controller that repeats first torque control making the first motor 11 output forward driving torque and second torque control making the second motor 21 output rearward driving torque when receiving a periodic on-signal of the acceleration pedal switch 102 after receiving an on-signal of the rocking-free switch 101.

Alternatively, the controller 100 may include a vehicle controller 110 that applies a motor torque instruction for the rocking-free function to a motor controller 120 when receiving a periodic on-signal of the acceleration pedal switch 102 after receiving an on-signal of the rocking-free switch 101, and the motor controller 120 that repeats first torque control making the first motor 11 of the rear wheel-first electric-axle 10 output forward driving torque and making the second motor 21 of the rear wheel-second electric-axle 20 output rearward driving torque on the basis of the motor torque instruction. The controllers, in combination, are referred to as a controller to help understand the present invention.

The controller 100 is configured to repeat the first torque control making the first motor 11 output forward driving torque and the second torque control making the second motor 21 output rearward driving torque until the vehicle escapes from a rough road in a response to a periodic on-signal of the acceleration pedal switch 102 after receiving an on-signal of the rocking-free switch 101.

The controller 100 decreases in advance the torque of the first motor 11 to zero such that the first axle shaft 12 and the first wheel 13 connected to the first motor 11 naturally rotate in a standby state when performing the second torque control such that the second motor 21 outputs rearward driving torque after performing the first torque control such that the first motor 11 outputs forward driving torque.

Furthermore, the controller 100 decreases in advance the torque of the second motor 21 to zero such that the second axle shaft 22 and the second wheel 23 connected to the second motor 21 naturally rotate in a standby state when performing again the first torque control such that the first motor 11 outputs forward driving torque after performing the second torque control such that the second motor 21 outputs rearward driving torque.

Accordingly, a first operation in which the forward driving torque of the first motor 11 of the rear wheel-first electric-axle 10 is output to the first axle shaft 12 and the first wheel 13 such that the first wheel 13 is rotated forward to move to the front end portion from the bottom portion of a rough road and a second operation in which the rearward driving torque of the second motor 21 of the rear wheel-second electric-axle 20 is output to the second axle shaft 22 and the second wheel 23 such that the second wheel 23 is rotated rearward to move to the rear end portion from the bottom portion of the rough road are repeated. Therefore, a recoiling force for escaping from the rough road is generated in the vehicle, facilitating the first wheel 13 and the second wheel 23 to easily escape from the rough road.

A rough road escaping method for a vehicle having an electric-axle of the present invention is described in detail hereafter on the basis of the configuration of the system described above.

Figure 3:
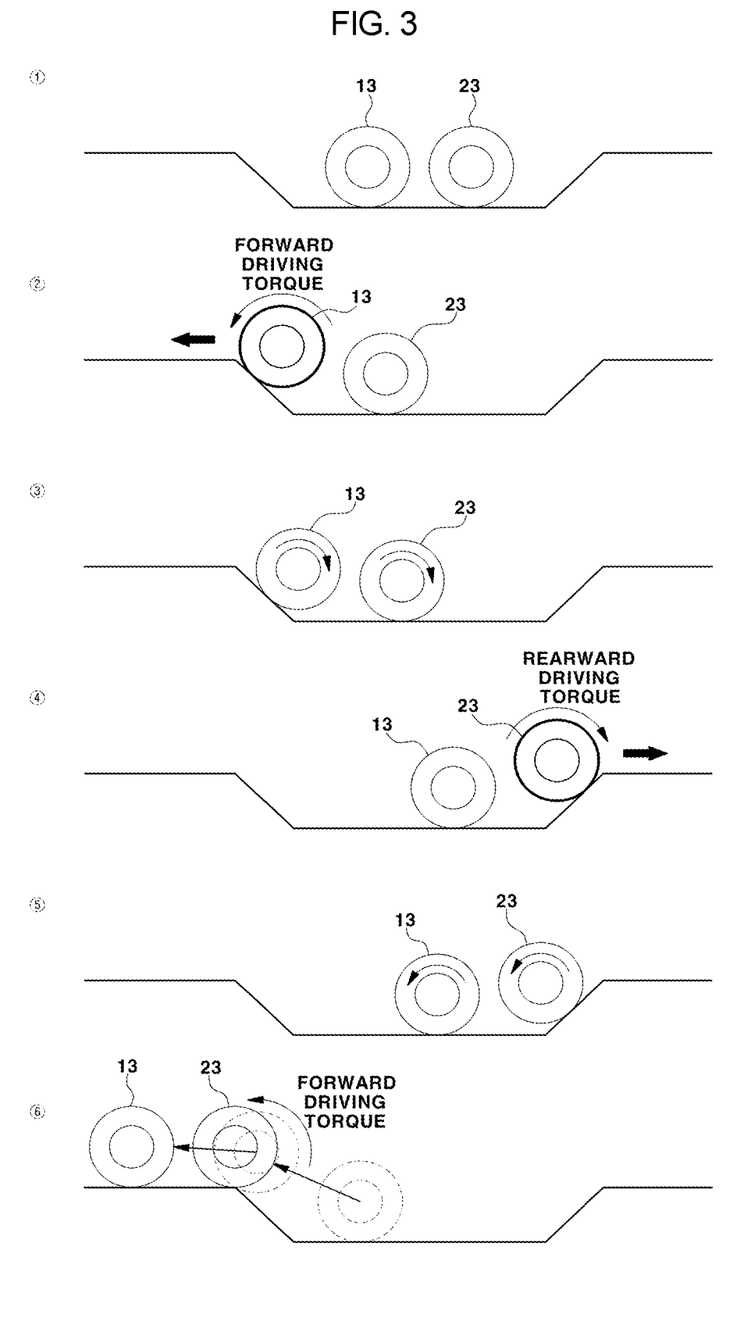
FIG. 3 is a conceptual diagram showing the operation of escaping from a rough road of a vehicle having an electric-axle according to various exemplary embodiments of the present invention.
Figure 4:
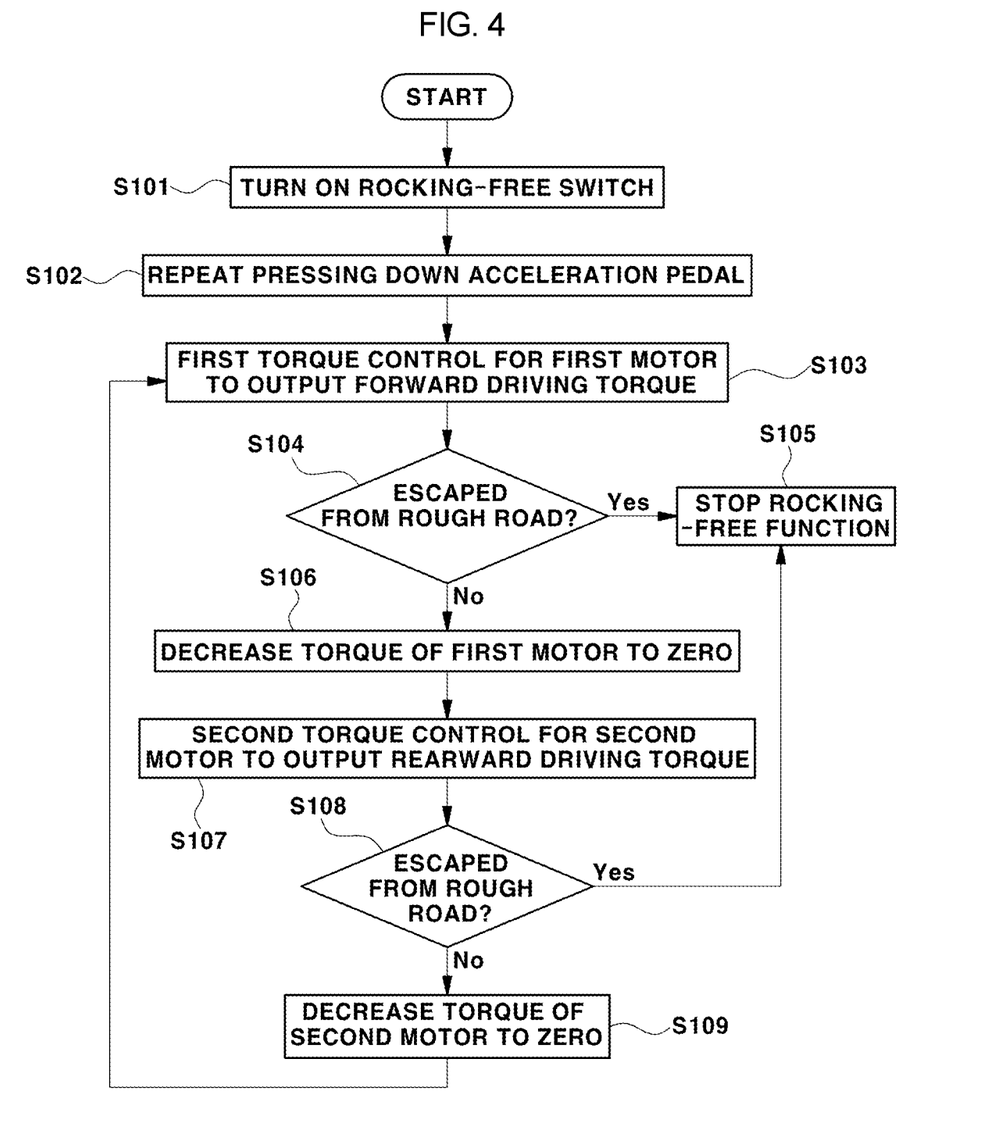
FIG. 4 is a flowchart showing a rough road escaping method for a vehicle having an electric-axle according to various exemplary embodiments of the present invention.

FIG. 3 is a conceptual diagram showing the operation of escaping a rough road of a vehicle having an electric-axle according to various exemplary embodiments of the present invention and FIG. 4 is a flowchart showing a rough road escaping method for a vehicle having an electric-axle according to various exemplary embodiments of the present invention.

First, when the first wheel 13 connected to the rear wheel-first electric-axle 10 and the second wheel 23 connected to the rear wheel-second electric-axle 20 sink into a rough road and cannot escape while idling, as indicated by ① in FIG. 3, a driver operates the rocking-free switch 101 in the cabin (S101).

As the rocking-free switch 101 is turned on an on-signal is transmitted to the controller 100.

Next, the driver repeats pressing down and releasing the accelerator pedal in a predetermined time period (S102).

That is, the driver periodically repeats pressing down the accelerator pedal with the rocking-free switch 101 turned on.

Accordingly, on-signals are periodically transmitted from the rocking-free switch 102 to the controller 100.

Next, when receiving an initial on-signal of the acceleration pedal switch 102 after receiving an on-signal of the rocking-free switch 101, the controller 100 performs the first torque control such that the first motor 11 of the rear wheel-first electric-axle 10 outputs forward driving torque (S103).

When the first motor 11 included in the rear wheel-first electric-axle 10 outputs forward driving torque, the second motor 21 included in the rear wheel-second electric-axle 20 is maintained in the standby state without the torque thereof controlled, so natural rotation is possible.

Accordingly, forward driving torque of the first motor 11 of the rear wheel-first electric-axle 10 is output to the first axle shaft 12 and the first wheel 13, whereby the first operation in which the first wheel 13 is rotated forward to move to the front end portion from the bottom portion of the rough road is achieved, as indicated by ② in FIG. 3.

Whether the first wheel 13 and the second wheel 23 has escaped from the rough road only through the first operation is checked (S104), and if so, the rocking-free function is automatically stopped such that the vehicle is normally driven (S105).

When the wheels have not escaped from the rough road as the result of checking in S104, the controller 100 performs the second torque control such that the second motor 21 of the rear wheel-second electric-axle 20 outputs rearward driving torque in a response to the next on-signal of the acceleration pedal switch 102 (S107).

The torque of the first motor 11 is decreased to zero in advance before the second torque control is performed (S106).

In detail, when the second torque control making the second motor 21 output rearward driving torque is performed after the first torque control making the first motor 11 output forward driving torque, as described above, the controller 100 decreases in advance the torque of the first motor 11 to zero. The reason is for preventing the torque of the first motor 11 from acting as load when the second motor 21 outputs the rearward driving torque.

As the forward driving torque of the first motor 11 of the rear wheel-first electric-axle 10 becomes zero, the first wheel 13 naturally rotates to the bottom portion of the rough road and the second wheel 23 also naturally rotates to the bottom portion of the rough road, as indicated by ③ in FIG. 3.

Next, the controller 100 performs the second torque control such that the second motor 21 of the rear wheel-second electric-axle 20 outputs rearward driving torque (S107).

In the instant case, the first motor 11 included in the rear wheel-first electric axle 10 is maintained in the standby state without the torque thereof controlled and can naturally rotate when the second motor 21 included in the rear wheel-second electric-axle 20 outputs rearward driving torque by S106.

Accordingly, rearward driving torque of the second motor 21 of the rear wheel-second electric-axle 20 is output to the second axle shaft 22 and the second wheel 23, whereby the second operation in which the second wheel 23 is rotated rearward to move to the rear end portion from the bottom portion of the rough road is achieved, as indicated by ④ in FIG. 3.

Whether the first wheel 13 and the second wheel 23 has escaped from the rough road through the second operation is checked again (S108), and if so, the rocking-free function is automatically stopped such that the vehicle is normally driven (S105).

When the wheels have not escaped from the rough road as the result of checking in S108, the controller 100 performs the first torque control such that the first motor 11 of the rear wheel-first electric-axle 10 outputs forward driving torque in a response to the next on-signal of the acceleration pedal switch 102 (S103).

The torque of the second motor 21 is decreased to zero in advance before the first torque control is performed again (S109).

In detail, when the first torque control making the first motor 11 output forward driving torque is performed again, the controller 100 decreases the torque of the second motor 21 in advance to zero. The reason is for preventing the torque of the second motor 21 from acting as load in the opposite direction when the first motor 11 outputs the forward driving torque.

As the rearward driving torque of the second motor 21 of the rear wheel-second electric-axle 20 becomes zero, the second wheel 23 naturally rotates to the bottom portion of the rough road and the first wheel 13 also naturally rotates to the bottom portion of the rough road, as indicated by ⑤ in FIG. 3.

Next, the controller 100 performs the first torque control again such that the first motor 11 of the rear wheel-first electric-axle 10 outputs forward driving torque.

Accordingly, forward driving torque of the first motor 11 of the rear wheel-first electric-axle 10 is output again to the first axle shaft 12 and the first wheel 13, whereby the first operation in which the first wheel 13 is rotated forward to move to the front end portion from the bottom portion of the rough road is achieved.

As described above, the first operation in which the forward driving torque of the first motor 11 of the rear wheel-first electric-axle 10 is output to the first axle shaft 12 and the first wheel 13 such that the first wheel 13 is rotated forward to move to the front end portion from the bottom portion of a rough road and the second operation in which the backward driving torque of the second motor 21 of the rear wheel-second electric-axle 20 is output to the second axle shaft 22 and the second wheel 23 such that the second wheel 23 is rotated rearward to move to the rear end portion from the bottom portion of the rough road are repeated, whereby a recoiling force for escaping from the rough road may be generated in the vehicle.

As a result, the recoiling force of the vehicle enables the first wheel 13 and the second wheel 23 to easily come out of the rough road, as indicated by ⑥ in FIG. 3, and then the free rocking function is automatically stopped such that the vehicle is normally driven (S105).

As described above, it is possible to easily achieve the rocking-free function for escaping from a rough road even in a vehicle such as an electric truck or fuel cell electric truck provided with an electric-axle.

Figure 5:
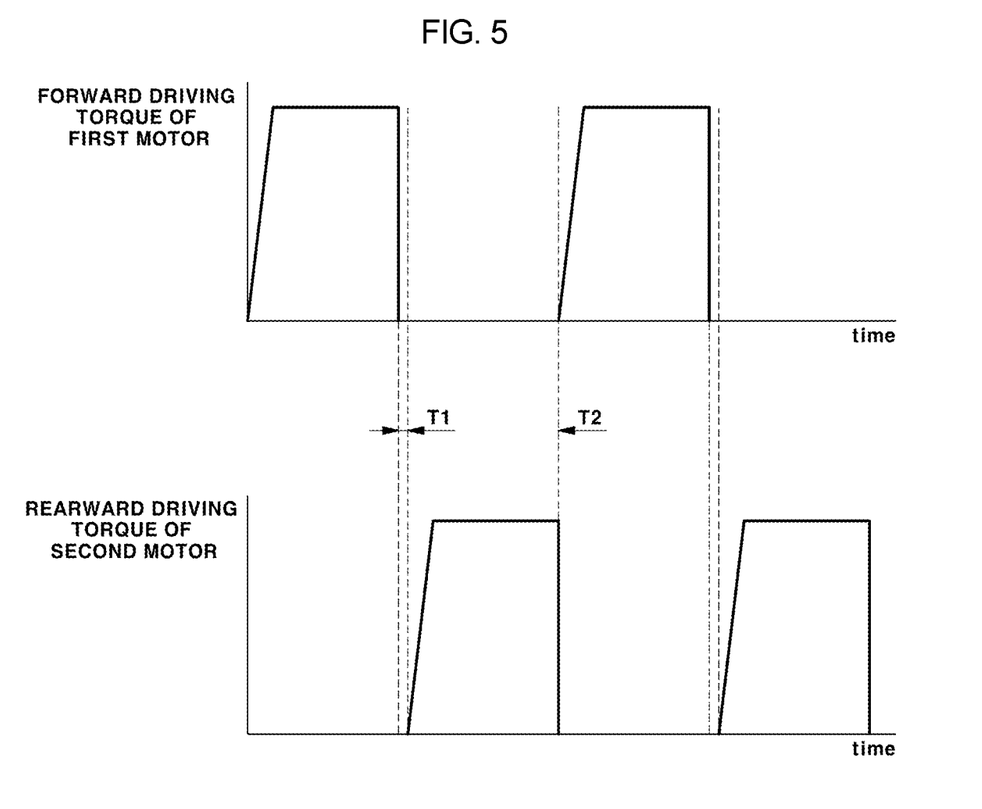
FIG. 5 is a graph showing an example of controlling torque of a first motor and a second motor when a vehicle having an electric-axle according to various exemplary embodiments of the present invention escapes from a rough road.

In other words, a recoiling force is generated in the vehicle through the motor torque control that alternately applies several times the forward driving torque output from the first motor 11 included in the rear wheel-first electric axle 10 to the first axle shaft 12 as shown in the upper graph in FIG. 5 and rearward driving torque output from the second motor 21 included in the rear wheel-second electric-axle 20 to the second axle shaft 22 as shown in the lower graph in FIG. 5. Accordingly, the rocking-free function facilitating the wheels connected to the first and second axle shafts to easily come out of a rough road may be achieved.

Meanwhile, when performing the first torque control making the first motor 11 output forward driving torque and the second torque control making the second motor 21 output rearward driving torque, the controller 100 may set the interval between the first torque control and the second torque control as a predetermined time period, as indicated by 'T1' in FIG. 5, or may set the interval as a minimum time within a range allowed by a vehicle system, depending on the kind of the vehicle, as indicated by 'T2' in FIG. 5 such that the period between the first torque control and the second torque control may be minimized.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A rough road escaping system for a vehicle having an electric-axle, the rough road escaping system comprising:
    a rocking-free switch;
    an acceleration pedal switch configured for outputting an on-signal in response that an accelerator pedal is pressed;
    a first motor provided in a rear wheel-first electric-axle;
    a second motor provided in a rear wheel-second electric-axle; and
    a controller configured for repeating first torque control making the first motor output forward driving torque and second torque control making the second motor output rearward driving torque in a response to a periodic on-signal of the accelerator pedal switch,
    wherein when receiving an initial on-signal of the acceleration pedal switch, the controller performs the first torque control and the controller performs the second torque control in a response to a next on-signal of the acceleration pedal switch,
    wherein the controller includes:
        a motor controller electrically connected to the first motor and the second motor; and
        a vehicle controller electrically connected to the motor controller and configured for applying a motor torque instruction for a rocking-free function to the motor controller when receiving the on-signal of the acceleration pedal switch after receiving an on-signal of the rocking-free switch, and
    wherein the motor controller is configured for repeating the first torque control making the first motor output the forward driving torque to a first axle shaft of the rear wheel-first electric axle and the second torque control making the second motor output the rearward driving torque to a second axle shaft of the rear wheel-second electric-axle.

2. The system of claim 1, wherein the controller is configured to alternately repeat the first torque control making the first motor output the forward driving torque and the second torque control making the second motor output the rearward driving torque, until the vehicle escapes from a predetermined area of a road.

3. The system of claim 1, wherein the controller is configured to decrease torque of the first motor in advance to zero when performing the second torque control making the second motor output the rearward driving torque after performing the first torque control making the first motor output the forward driving torque.

4. The system of claim 1, wherein the controller is configured to decrease torque of the second motor in advance to zero when performing again the first torque control making the first motor output the forward driving torque after performing the second torque control making the second motor output the rearward driving torque.

5. The system of claim 1, wherein when the first motor provided in the rear wheel-first electric axle outputs the forward driving torque, the second motor provided in the rear wheel-second electric-axle is maintained in a standby state without torque thereof controlled by the controller.

6. The system of claim 1, wherein when the second motor provided in the rear wheel-second electric axle outputs the rearward driving torque, the first motor provided in the rear wheel-first electric-axle is maintained in a standby state without torque thereof controlled by the controller.

7. The system of claim 1, wherein when performing the first torque control making the first motor output the forward driving torque and the second torque control making the second motor output the rearward driving torque, the controller is configured to set a time interval between the first torque control and the second torque control.

8. A rough road escaping method for a vehicle having an electric-axle, the rough road escaping method comprising:
receiving, by a controller, an on-signal of a rocking-free switch;
receiving, by the controller, a periodic signal of an accelerator pedal with the on-signal of the rocking-free switch; and
repeating, by the controller, first torque control making a first motor provided in a rear wheel-first electric axle output forward driving torque and second torque control making a second motor provided in a rear wheel-second electric-axle output rearward driving torque, in response that the controller receives the periodic signal of the accelerator pedal,
when receiving an initial on-signal of the acceleration pedal switch, the controller performs the first torque control and the controller performs the second torque control in a response to a next on-signal of the acceleration pedal switch.

9. The method of claim 8, wherein when the first motor provided in the rear wheel-first electric axle outputs the forward driving torque, the second motor provided in the rear wheel-second electric-axle is maintained in a standby state without torque thereof controlled by the controller.

10. The method of claim 8, wherein when the second motor provided in the rear wheel-second electric axle outputs the rearward driving torque, the first motor provided in the rear wheel-first electric-axle is maintained in a standby state without torque thereof controlled by the controller.

11. The method of claim 8, wherein the first torque control making the first motor output the forward driving torque and the second torque control making the second motor output the rearward driving torque are alternately repeated by the controller until the vehicle escapes from a predetermined area of a road.

12. The method of claim 11, wherein a recoiling force of the vehicle for escaping the road is generated by repeating:
a first operation in which the forward driving torque of the first motor of the rear wheel-first electric-axle is output to a first axle shaft and a first wheel so that the first wheel rotates forward to move to a front end portion from a bottom portion of the predetermined area in the road; and
a second operation in which the rearward driving torque of the second motor of the rear wheel-second electric-axle is output to a second axle shaft and a second wheel so that the second wheel rotates rearward to move to a rear end portion from the bottom portion of the predetermined area in the road.

13. The method of claim 8, wherein torque of the first motor is decreased by the controller in advance to zero when the second torque control making the second motor output rearward driving torque is performed after the first torque control making the first motor output the forward driving torque is performed.

14. The method of claim 8, wherein torque of the second motor is decreased by the controller in advance to zero when the first torque control making the first motor output the forward driving torque is performed again after the second torque control making the second motor output the rearward driving torque.

15. The method of claim 8, wherein when performing the first torque control making the first motor output the forward driving torque and the second torque control making the second motor output the rearward driving torque, the controller is configured to set a time interval between the first torque control and the second torque control.

16. A non-transitory computer readable storage medium on which a program for performing the method of claim 8 is recorded.

* * * * *